United States Patent
Owings

(10) Patent No.: US 8,877,048 B1
(45) Date of Patent: Nov. 4, 2014

(54) CASCADING SYSTEM OF FLOODWAY STORMWATER CONTAINMENT BASINS

(76) Inventor: Samuel Owings, Chestertown, MD (US)

(*) Notice: Subject to any disclaimer, the term of this patent is extended or adjusted under 35 U.S.C. 154(b) by 295 days.

(21) Appl. No.: 13/602,327

(22) Filed: Sep. 4, 2012

Related U.S. Application Data

(60) Provisional application No. 61/573,110, filed on Sep. 2, 2011.

(51) Int. Cl.
| | | |
|---|---|---|
| *E03F 1/00* | (2006.01) | |
| *E02B 13/00* | (2006.01) | |
| *E03F 5/10* | (2006.01) | |
| *C02F 3/32* | (2006.01) | |
| *C02F 103/00* | (2006.01) | |

(52) U.S. Cl.
CPC ............... *E03F 1/002* (2013.01); *E02B 13/00* (2013.01); *C02F 3/32* (2013.01); *C02F 2103/001* (2013.01); *E03F 5/103* (2013.01)
USPC ............... 210/170.03; 210/170.08; 210/202; 210/255; 210/602

(58) Field of Classification Search
CPC ............... E02B 5/00; E02B 13/00; E03F 1/00; E03F 1/002; E03F 5/103; C02F 3/32; C02F 2103/001
USPC .......... 210/170.01, 170.03, 170.08, 202, 255, 210/602, 747.2, 747.3; 405/36, 50, 52, 80, 405/118

See application file for complete search history.

(56) References Cited

U.S. PATENT DOCUMENTS

| | | | | |
|---|---|---|---|---|
| 2,382,010 | A * | 8/1945 | Hodges | 210/602 |
| 3,429,806 | A * | 2/1969 | Wiser et al. | 210/621 |
| 4,209,388 | A * | 6/1980 | DeFraites | 210/170.08 |
| 4,839,051 | A * | 6/1989 | Higa | 210/602 |
| 4,876,004 | A * | 10/1989 | Verhoeff | 210/170.08 |
| 5,078,882 | A * | 1/1992 | Northrop | 210/602 |
| 5,174,897 | A | 12/1992 | Wengrzynek | |
| 5,330,651 | A | 7/1994 | Robertson et al. | |
| 5,823,711 | A | 10/1998 | Herd et al. | |
| 6,755,972 | B1 * | 6/2004 | Kouloumbis | 210/602 |
| 2003/0019150 | A1 | 1/2003 | St. Onge et al. | |
| 2007/0160424 | A1 | 7/2007 | Underwood | |
| 2008/0197073 | A1 * | 8/2008 | Jacquet | 210/170.08 |
| 2009/0290936 | A1 | 11/2009 | Underwood | |

* cited by examiner

*Primary Examiner* — Christopher Upton
(74) *Attorney, Agent, or Firm* — Donald Grant Kelly

(57) ABSTRACT

A series of cascading basins is excavated along a sloped floodway typically established between adjoining agricultural fields. These basins address problems of stormwater runoff from agricultural lands and certain urban areas where runoff carries sediment, nitrogen, phosphorous and other pollutants into nearby streams, rivers and tidal waters, The cascading basin series begins with basin placement at a higher topographical elevation, followed by basin positioning downwardly along a natural or excavated floodway slope simulating a terraced effect. As upper basins are filled they spill over into basins therebelow. Angular features of basin exit grade and stormwater escape slopes retard egress of stormwater. A lowermost terminal basin includes sand berm, boulders, rip rap and other barriers to retain the polluted runoff. Basins may include vegetation, slag stone layers, and other pollutant treatment elements.

8 Claims, 3 Drawing Sheets

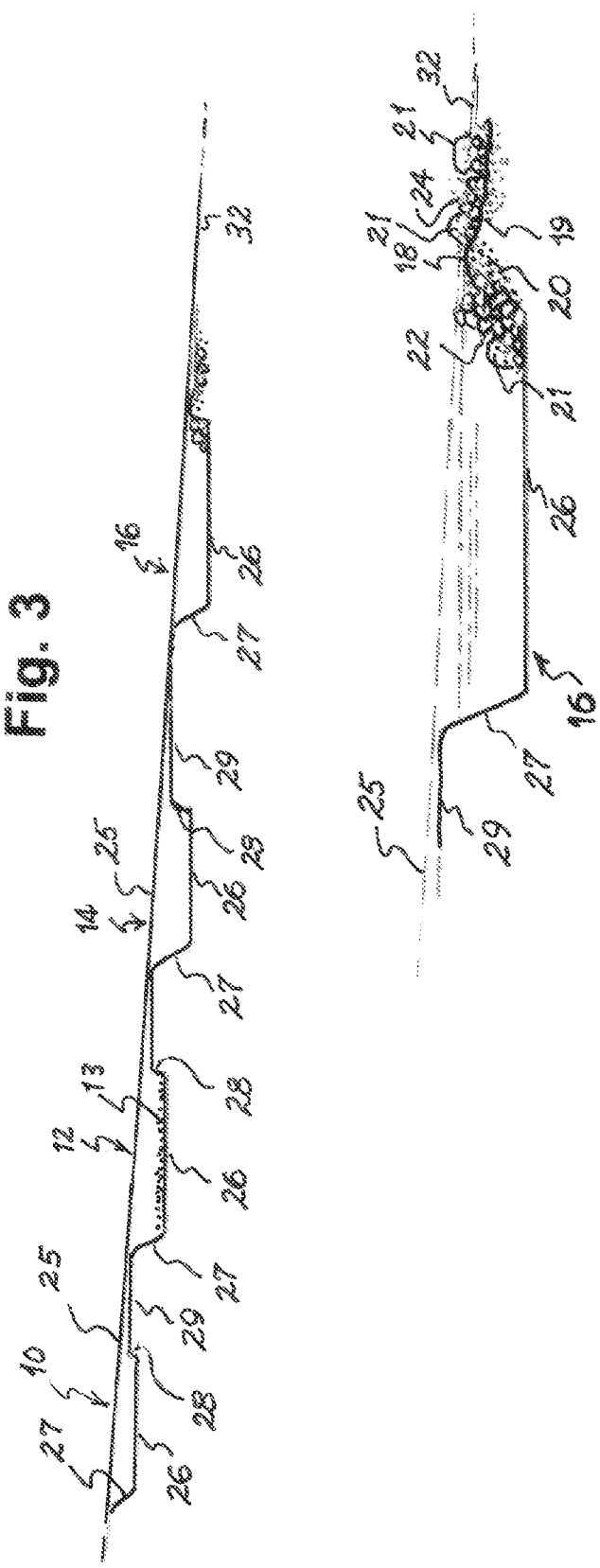

CASCADING SYSTEM OF FLOODWAY STORMWATER CONTAINMENT BASINS

CROSS-REFERENCE TO RELATED APPLICATIONS

The present application claims priority to U.S. Provisional Patent Application Ser. No. 61/573,110 filed on Sep. 2, 2011, titled Cascading System of Floodway Stormwater Containment Basins, the disclosure of which is incorporated by reference in its entirety for all purposes, as if fully set forth herein.

FIELD OF THE DISCLOSURE

The present disclosure relates generally to nonpoint source pollution caused by rainfall or snowmelt, and more particularly to constructs, systems and methods for capturing and treating agricultural field runoff including chemical pollutants that would otherwise reach rivers, streams, wetlands and coastal waters.

BACKGROUND

Pollution of streams and waterways has been a globally recognized problem for a great many years as storm water runoff from agricultural land carries with it sediment, nitrogen and phosphorous, as well as other pollutants into streams, rivers and tidal waters. While concerns are typically expressed locally, the problem is national in scope.

According to the Environmental Protection Agency (EPA), the United States has more than 330 million acres of agricultural land that producing an abundant supply of food and other products. American agriculture is noted worldwide for its high productivity, quality and efficiency in delivering goods to the consumer. Improperly managed, however, activities from working farms and ranches can adversely affect water quality.

In the 2000 *National Water Quality Inventory*, states reported that agricultural nonpoint source (NPS) pollution* was the leading source of water quality impacts on surveyed rivers and lakes, the second largest source of impairments to wetlands, and a major contributor to contamination of surveyed estuaries and ground water. (Worldwide Web: epa.gov "*Polluted Runoff (Nonpoint Source Pollution)*." [*Note: NPS pollution comes from runoff, such as rainfall or snowmelt, moving over and through the ground, picking up pollutants as it goes. Some of these pollutants occur naturally, such as nutrients from sediments, manure or pet wastes; others are manmade, such as fertilizers or automotive grease.]

As a case in point, more recent EPA statistics (released in 2009) indicate the stormwater accounts for 100% of sediment entering the endangered Chesapeake Bay. Closer analysis reveals that as much as 60% of stormwater borne pollution is agricultural in origin. Data show that stormwater accounts for 42% of nitrogen entering the Bay, with 32% of that flushed from regional farms. As much as 76% of another troubling Bay pollutant, phosphorus, is also introduced with runoff stormwater, with nearly half of that known to be agricultural in origin.

Not surprisingly, massive resources (both government and privately funded) have been sunk into inventing and deploying varied approaches to addressing this serious issue, which reaches beyond concerns for waterway and wetland pollution to groundwater safety with boundless implications. Thus, the problems of runoff are, of course, not limited to the agricultural business since potentially polluting chemicals such as herbicides and fertilizers enjoy unprecedented application in neighborhoods, golf courses, parks and highways.

A wide variety of concepts have been proposed but with limited success for a number of reasons. Practices most commonly used to control runoff pollution include (1) filter strips, (2) grass waterways and (3) wetlands (natural and constructed). Past and ongoing financial investment and land commitment to these practices varies, as does the effectiveness of pollution attenuation.

Filter strips comprise narrow, vegetative bands (grass or trees) strategically planted along the edges of streams, rivers, bays. These bands may be planted in various widths from as narrow as twenty feet or as wide as several hundred feet. The intended outcome of this practice is that runoff will be filtered before it can reach waterways. More particularly, as stormwater flows off the land/fields and passes through the filter strips, sediment and nutrients are filtered or contained therein, thus preventing the pollutants from migrating to streams and tidal waters. The problem with this practice is that an unusually heavy rain event brings such a high flow rate of stormwater runoff that only a relatively small portion of the flowing pollutants can be captured. Moreover, since runoff may have traversed a considerable distance from its origin, perhaps miles, before it encounters filter strips residing only along stream or bay edges, there may be far too much runoff accumulation to filter effectively.

"Grass waterways" (also commonly referred to as "floodways") are relatively low topographical, grassy areas into and along which stormwater flows as it leaves the agricultural fields, then progresses downhill and eventually into a stream/river/bay. Floodway practice can be effective in preventing gullies or washout ditches from forming, thereby avoiding eroded sediment from washing into streams/rivers/bay waters. Further, floodway vegetation has been found somewhat effective as a natural filtering system accomplishing the objectives mentioned with respect to the above-discussed filter strips. Another aspect in common with the filter strip approach: grass waterways generally fail in their filtering role in the face of heavy stormwater accumulations and the consequential acceleration of long distance runoffs.

"Wetlands" is the general name for natural or purposefully constructed land areas on which water covers the soil (or is present either at or near the surface of the or within the root zone) at least for varying time periods. Recurrent or prolonged presence of water (hydrology) at the soil surface is the dominant factor determining the soil nature and types of plants living in the soil. Wetlands are characteristically defined by the presence of plants (hydrophytes) adapted to life in soil subjected to flooded or saturated conditions (typically referred to as hydric soils). [Mitsch, W. J. and J. G. Gosselink, 1993; *Wetlands,* 2nd Ed. John Wiley & Sons; New York; 722 pp].

Situated between the "dry" land and the water, wetlands can serve as buffers by slowing the flow of pollutants into tributaries and onward to larger bodies of water such as the Chesapeake Bay and its tributaries. As polluted stormwater runs off the agricultural land and passes through wetlands, the hydrophytes [trees and grasses native to the wetland soil] serve to filter and absorb nutrients, suspended sediments and chemical contaminants. [Chesapeake Bay Program Watershed Project, Annapolis, Md. website at chesapeakebay.net/wetlds1.htm]

Natural wetlands, of course, are reasonably effective only when they happen to be strategically located with respect to flows of agricultural runoff. Constructed (or manmade) wetlands are extremely expensive to create, particularly considering the plantings involved. Again, similar to the above-described filter strips and waterways, a heavy rain event can deliver such heavy volumes of runoff that the resultant flow through the wetlands overrides its capacity to effectively address sediment and nutrients. These widespread "solutions" have fallen short of their good intentions, leading to the development of still other approaches. The patent literature reflects ongoing interest in developing commercializable systems to address the challenge of stormwater runoff pollution as well as other contamination treatments. The following is a sampling from a cursory review of US patent files.

U.S. Pat. No. 5,823,711 granted to Herd et al. (henceforth referenced as Herd) presents a system for trapping and recycling surface water containing treatment chemicals, particularly on golf courses and possibly farms. The Herd drainage and collection system includes a graded channel in which is secured a water impervious liner covering the channel bottom and wall surfaces. Scrap automobile tire components are positioned within the channel and on top of the liner.

The Herd system includes a drainage reservoir formed at a low point in the channel. The surface water percolates through and around the scrap tire components, runs down the grades of the liner, and collects within the reservoir. A pumping station(s) cooperates with an irrigation system to recycle the water and chemicals back to the surface of the golf course or the like. The objective of the Herd system is the collection, storage, and recirculation of water and chemicals used to maintain the field area. Repeatedly recycled fertilizer-laden runoff, of course, has its own natural limitations in terms of continued effectiveness and scale of application.

In U.S. Pat. No. 5,330,651 entitled Treatment of Contaminated Agricultural Run-off, Canadian inventors Robertson, Blowers and Ptacek (subsequently referenced as Robertson) disclose a system of land drains to convey nitrate-polluted run-off water from a field to a reservoir. The proposed reservoir would be large enough to contain excess quantities of storm water run-off. From the reservoir, the water enters a collection tank containing submerged wood or other organic carbon material. The wood is kept under water, i.e., under anaerobic conditions, whereby nitrates are broken down by bio-chemical action. Sufficient wood is added and flow rate is adjusted such that the nitrate-polluted water spends many hours in contact with the wood.

The objective of the Robertson invention is to provide a treatment which will break down the nitrate in water washed off an agricultural field so that run-off water eventually passing away from the field is substantially nitrate-free. The Robertson invention is mainly concerned with treating water that enters drainage ditches, land-drains. This system may or may not sufficiently treat the nitrate-laden water and does little or nothing with respect to accompanying pollutants, all of which then depart for the estuaries and coast.

Wengrzynek's U.S. Pat. No. 5,174,897 also deals with nonpoint source water pollution. The Wengrzynek invention proposes a staged construct comprising (in hydraulic order) a sediment basin, level-lip spreader, grassy filter, wetland, and deep pond, the combination of which can be used to remove pollutants from nonpoint source runoff. Wetlands are planted with vegetation that encourages growth of aerobic and anaerobic bacteria which are helpful in removing and detoxifying contaminants. This would appear to be a grand scale approach, and essentially un-scalable.

A system presented by St. Onge and Smith (hereafter: St. Onge) is reflected in Published Patent Application 2003/0019150 entitled: Reclamation System for Agricultural Run-off. This published patent application relates to systems for collecting excess water applied to crops, treating the collected water and reusing the treated water for agricultural purposes, or delivering the treated water to ground water streams. Their objective is to achieve cost savings, healthier plants, and reduce the environmental burden.

More specifically, the St. Onge systems purportedly would significantly reduce costs involved in providing water, nitrogen fertilizer, herbicides and/or pesticides to crops by doing the following: a) capturing as much as possible of the water provided to the planting area which is not taken up by the planted crops; b) treating that captured water with ozone; c) reapplying the ozone treated water to the crops. According to St. Onge patent applicants, the quality and quantity of food stuffs produced is also increased by the process. This is another scheme for continuously recycling pollutants.

The aforementioned patents and published patent application are purposed to capture and treat run-off pollutants, and in some instances to recycle run-off water. However, none of those patent documents presents a system as effective, yet elegantly simple, straightforward and easily replicable/scalable as the novel Cascading System of Floodway Stormwater Containment Basins presently disclosed. For the record, each of the above discussed patent documents, in its entirety, was incorporated by reference in its entirety within cross-referenced Provisional Patent Application Ser. No. 61/573,110.

The presently presented unique cascading basin system, unlike pre-existing treatment schemes, captures and/or recaptures stormwater and runoff starting with higher elevation such that its flow toward downstream waterways is extremely diminished or eliminated, while contaminants are retained within the basins. Moreover the stormwater/runoff is oxygenated during its cascading motion from one containment basin to the next, thereby positively altering the molecular structure of contained nitrates as other pollutants suspended therein.

In essence, this unique cascading system not only accomplishes the sought-after end results of the above-noted common practices, but substantially eliminates discharge altogether. Confidential testing of a full scale prototype array of cascading basins designed to handle runoff rates of the magnitude of a 50-year storm event has realized zero pollution discharge.

Hence, the present invention solves the agricultural runoff problem, and does so in a relatively inexpensive manner. The unique structure described below offers special advantages as will be appreciated from reading this specification. A brief description of the invention and its method of use or application is set forth in the next section; followed by reference to accompanying drawings and a full and clear description.

BRIEF SUMMARY OF THE DISCLOSURE

A series of cascading basins (at least two basins in number but preferably comprising a plurality of basins defined in number, directional orientation and individual capacity by topography and capacity requirements) are strategically constructed/excavated along a sloped floodway typically established between adjoining agricultural fields. The cascading basin series begins with basin placement at a higher topographical elevation, followed by basin placements staggered downwardly along a natural or excavated floodway slope simulating a terraced effect. As agricultural field runoff flow rate builds and feeds into the stormwater floodway, it is captured in basins which then generally overflow downwardly to subsequent basins.

This system is designed to capture stormwater along with runoff pollutants, starting at higher elevations and in such volume that water flow at a lowermost elevation (e.g., where it would have flowed into streams, rivers, and/or bay) is extremely diminished or essentially eliminated. Moreover, stormwater is aerated and oxygenated in the cascading action, changing molecular structure of nitrates and other suspended pollutants. The scale of this system is intended to essentially eliminate stormwater discharge altogether for up to a 50-year storm event.

These basins are generally created as excavated, unlined earthen containment receptacles or cells, each with a profile dictated by: (a) a stormwater flow entry grade downwardly inclined from the floodway slope toward the basin bottom or floor, and followed downstream by (b) an exit grade upwardly inclined from the cell floor, feeding stormwater and runoff to an escape slope intersecting downstream with said floodway slope. The escape slope, with its degree of incline somewhat less than the floodway slope, serves to retard cascading stormwater egress from the basin. This is because the combined exit grade and escape slope is considerably greater than the basin entry grade. Another favorable aspect of this arrangement is the inherent oxygenation aspect. As each cascading action occurs, aeration of polluted stormwater takes place. Further, each basin may include ancillary chemical treatment materials or vegetation plantings and/or bottom layered particulate (e.g., a 6-inch layer of slag stone or the like). The final or lowermost terminal basin of the cascading series includes a weir structure as a final filtering barrier to stormwater egress. This barrier may comprise such materials as sand, gravel, rip-rap, boulders, and filtering fabric. Again, the overall purpose of the cascading basins is to restrain polluted stormwater, keeping the stormwater on land so as to prevent it from entering and polluting streams, rivers and tidal waters.

The unique construction and capacity of these cascading basins is such that substantially all stormwater runoff pollution is ultimately retained and restrained from further migration. In its presently proposed formulation, the terraced, cascading containment basins are tailored principally for agricultural/rural use but are readily adaptable to residential or urban settings when space and slope are accommodating, without departing from the intended scope of the claimed invention.

BRIEF DESCRIPTION OF THE ILLUSTRATIONS

FIG. 3 is a diagrammatic image representing lateral profiles of the serial cascading basins of FIG. 2 relative to stormwater floodway slope;

FIG. 4 is a detailed schematic of the lowermost basin profile of the serial cascading basins graphically depicted in FIG. 3.

DETAILED DESCRIPTION

In the following detailed description of the present invention, reference is made to the accompanying drawings forming a part hereof, demonstrating by way of illustration specific embodiments in which the inventive system and method may be practiced. These embodiments are described in sufficient detail to enable those skilled in the art to practice the invention. It is to be understood that other embodiments may be utilized and that changes may be made without departing from the spirit and scope of the present invention. The following detailed description is, therefore, not to be taken in a limiting sense. The scope of the present invention will be defined only by claims presented herein.

Figure 1:
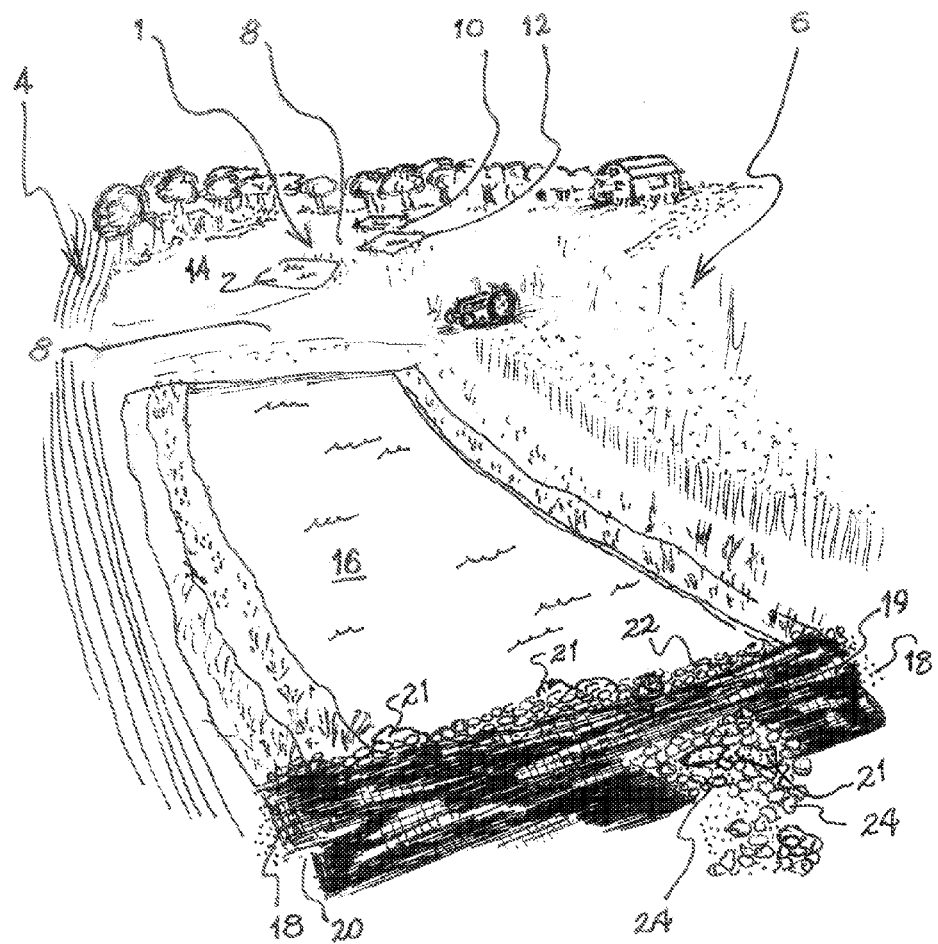
FIG. 1 is a perspective view of a cascading system constructed/operable in accordance with the present disclosure and applied to an agricultural environment, and depicting a series of cascading stormwater collection basins in a floodway.

Illustrated in FIG. 1 is a landscape perspective view presenting an example of a terraced cascading system 1 configured in accordance with the present disclosure. Appearing generally at a distant point (adjacent FIG. 1 upper edge) and extending toward the viewer along a sloping floodway 8 are strategically placed basins designated 10, 12, 14 and 16. Floodway 8 can be naturally formed or manmade. Cascading basins 10, 12, 14, 16 typically are situated as shown between adjacent agricultural fields 4 and 6. Each of said basins is separated from adjacent (upstream and downstream) basins by floodway 8 segments of varying length, again depending on topography. Floodway 8 typically follows a reasonably consistent downward slope (see diagrammatic slope 25 in FIGS. 3,4).

Viewed in FIG. 1 foreground, basin 16 represents the final or lowermost of the cascading basin series. At a downstream end of basin 16, a sand berm filter 18 and rip-rap revertment 22 are installed both for filtering residual pollutants and reinforcement against erosion. Also seen in this view is an optionally deployed felt filter fabric 19 (depicted in this view and FIGS. 2 and 4 as darkened elements or patterns). Filter fabric 19, when deployed, can be secured in place by rip-rap 22 and boulders 21 strategically placed thereon. A felt filter fabric 19 deployed in this manner serves the purpose of retarding residual stormwater discharge, if any, from basin 16.

Cascading cells or basins 10, 12, 14, 16 can be configured with various dimensions depending on the size and slope 25 of floodway 8 where such basins are to be located. It should be understood that slope 25 may obviously vary with terrain elevation changes; however, for simplicity of discussion, the slope is depicted as essentially linear. In any case, the floodway (natural or constructed) should have a relatively continuous downhill grade. Relative lateral (downhill) slope of adjacent fields 4, 6 and floodway 8 cascading slope 25 dictate the actual size and depth of each basin 10, 12, 14, 16.

Figure 2:
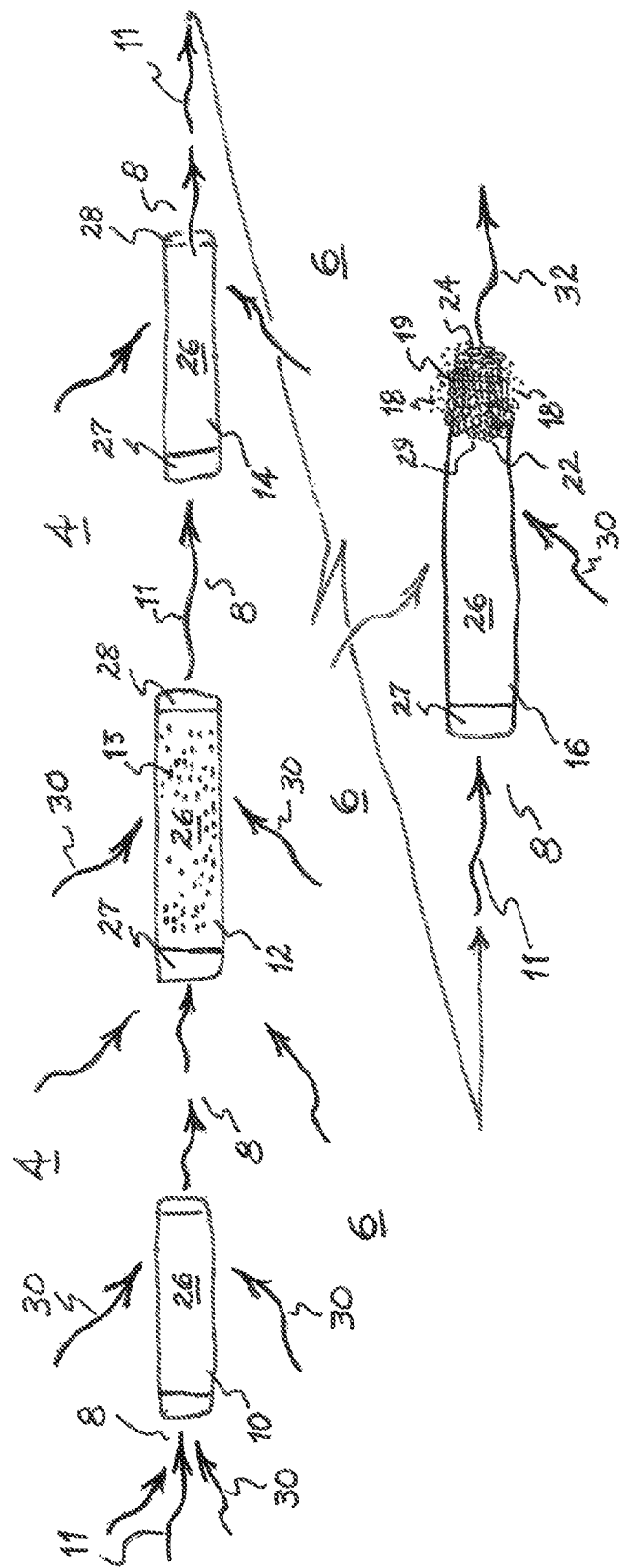
FIG. 2 is a schematic plan view representation of an example of serial cascading basins established in accordance with the present inventive disclosure.

As suggested in FIGS. 1, 2 and 3, the excavated basins 10, 12, 14, 16 need not follow a common (cookie-cutter) pattern in terms of dimensions and capacity. Stabilizing, filtering and pollutant treatment materials added to any or all of the basins may include: grass seed mixture such as fescue, switch grass and annual rye; stabilization fabric available commercially as Curlex®; 10-10-10 starter fertilizer; basin earthen cell floor treatment such as layered slag stone 13; sand particularly as a lowermost basin 16 berm sand filter 18, optionally covered by felt filter cloth 19; and stabilizing rip rap stone 22 and boulders 21. Long term maintenance may involve replenishing and upgrading the above materials as well as removing sediment expected to accumulate over time. Placement of these materials will be better understood with reference exemplar illustrations as follows.

The diagrammatic images represented in FIG. 2 depict a plan view of cascading basin system 1 with basins 10, 12, 14, 16 in generally aligned operational order along floodway 8. Floodway 8, with stormwater directional flow 11 and runoff 30 from adjacent fields 4, 6 enter the series of basins. Again, it must be noted that cascading basins are typically not so neatly aligned, but in reality placement depends wholly on topography.

Graphically illustrated in FIG. 3 is an elevation lateral profile of basins 10, 12, 14, 16 illustrating the terraced cascading effect from basin 10 to basin 12, and so on, along cascading slope 25 until flow reaches the lowermost basin 16. As mentioned earlier, the latter may include sand berm filter 18 with optional fabric filter 19, rip-rap revetment 22, boulders 21 and rip-rap overrun 24. FIG. 4 is an enlarged view of basin 16 to reveal more details of the construction of basin 16 downstream end as above discussed.

The elevation lateral profile (FIGS. 3 and 4) of basins 10, 12, 14, 16 illustrates a simplified excavation pattern of cascading basins "stepped downwardly" along floodway 8 along an average slope line depicted as 25. Each said basin (10, 12, 14, 16) is excavated along the slope line in such manner as to establish a downstream runoff entry grade 27 leading to a relatively flat basin bottom 26 acting as a holding cell.

At a downstream end of flat basin bottom 26 each of said basins is cut (excavated) so as to have an upwardly sloping rise establishing a basin exit grade 28 extending generally upwardly just shy of cascading slope-line 25. This results in a basin escape slope at each basin 10, 12, 14 exit slope measurably less steep than the cascading slope 25 of floodway 8. This configuration serves to continuously retard stormwater runoff. As now will be described, bottommost basin 16 does not offer an exit grade and escape slope 28, 29 of the type described hereabove.

The lowermost (ultimate) stage of cascading basin system 1 is apparent in FIG. 3, but best understood when viewed in conjunction with detailed FIG. 4. Notably different from the configuration of basins 10, 12, 14, the lowermost basin 16 downstream terminus is considerably bolstered and depicted as covered by a sand berm filter 18 and a revetment rip-rap 22 comprising sizeable crushed rock and layered sand 20, coupled with a sandy rip-rap overrun 24 and variously placed boulders 21. The sand berm filter 18 may (optionally) be covered at least in part with a felt filter fabric 19, with rip-rap stone 22 placed around and on the felt filter fabric 19 to hold it in place and help slow the stormwater flow. As viewed in FIGS. 2 and 4, exit-retarding berm filter 18 rises in a downstream direction along basin 16 exit grade 28 generally upward to the level of cascading slope 25. From that point, the berm filter 18 recedes to a generally planar level elevation 32 (FIGS. 2,3) where, in case of seriously heavy storm, overflow residual runoff 30 could be directed to a final resting pond, not shown.

While certain parameters are important to system 1 effectiveness, the relative locations, overall shapes and sizes of the cascading basins as depicted and illustrated herein should in no way be considered limiting. Indeed they can be configured in various dimensions depending on the size and slope of the floodways where the basins are to be located. By way of example only, and in no way to be considered as limiting the scope of this unique invention, an average basin size could be 40'×150' when placed on a 1.5% slope or less, with a depth of 2-3 feet. Again, this would vary according to site-specific characteristics and feasibility. With these dimensions, each basin has the capacity to contain between 75,000 to 112,500 gallons of stormwater. Simplicity of construction renders this unique system easily portable, scalable and topologically adaptable to areas in danger of serious and irreversible contamination by agricultural and urban runoff.

The presently disclosed system of the general scale just described is currently being tested as a pilot project to prevent sediment and nutrient laden agricultural stormwater from entering along the Chesapeake Bay watershed (along the Eastern Coast of the United States), replenish underground aquifers, and create wildlife habitat. Expected outcomes of the pilot project include containment of a total of between 825,000 and 1,237,500 gallons of stormwater and 4 tons of sediment per acre, per year, on a 275 acre drainage area, or 1,100 tons of sediment per year. In addition, the objective is to contain as much as 871.75 lbs. of nitrogen per acre, per year and 165 lbs. of phosphorus per acre per year.

Although various embodiments of the present invention system and its method of application have been described in the foregoing detailed description and illustrated in the accompanying drawings, it will be understood that the invention is not limited to the embodiments disclosed, but indeed may assume numerous arrangements, rearrangements, modifications, and substitutions of elements or steps without departing from the spirit and intended scope of the invention herein set forth.

I claim:

1. A cascading system of floodway stormwater containment basins for capturing pollution borne stormwater including a sloped floodway having an upper and lower topographical elevation and extending substantially continuously therebetween, and a series of containment basins positioned along said floodway, and further characterized by:
   said series of basins includes at least one upper basin and a lower terminal basin such that said series of basins extends substantially from said floodway upper to lower topographical elevation;
   said at least one upper basin is defined as an earthen containment receptacle with a substantially level bottom excavated along said floodway, and including a generally upper stormwater entry end and generally lower stormwater exit end relative to said sloped floodway, wherein said stormwater entry end and stormwater exit end are interconnected by generally opposing basin sides;
   said generally upper entry end of said at least one upper basin is further defined as presenting a stormwater entry grade relatively steeply inclined from the sloped floodway to intersect said substantially level bottom of said at least one upper basin;
   said generally lower exit end of said at least one upper basin is defined as having a relatively steeply inclined exit grade toward said sloped floodway, said exit grade intersected by a stormwater escape slope of lesser grade than said exit grade, such that combined exit grade and escape slope substantially exceed the stormwater entry grade so as to retard stormwater escape from said at least one upper basin;
   said lower terminal basin is defined as an earthen containment receptacle with a substantial level bottom excavated along said floodway, and including a generally upper stormwater entry end, and a generally lower end formed as a final filtering barrier, wherein said terminal basin generally upper stormwater entry end and lower end are interconnected by generally opposing sides;
   said generally upper entry end of said lower terminal basin is further defined as presenting a stormwater entry grade relatively steeply inclined from the sloped floodway to intersect said substantially level bottom of said lower terminal basin;
   said terminal basin final filtering barrier includes a sand berm and rip rap layers;
   whereby pollution borne stormwater flows from adjacent fields as runoff and along said floodway into said series of basins and is contained therein.

2. The cascading system of floodway stormwater containment basins of claim 1 wherein at least one of said series of cascading basins includes ancillary chemical treatment materials for pollution borne stormwater.

3. The cascading system of floodway stormwater containment basins of claim 1 wherein the lower terminal basin includes a weir at its filtering barrier.

4. The cascading system of floodway stormwater containment basins of claim 1 wherein at least one of said series of cascading basins includes vegetation plantings for treating pollution borne stormwater.

5. The cascading system of floodway stormwater containment basins of claim 1 wherein at least one of said series of cascading basins includes a layer of slag stone as treatment of polluted runoff.

6. The cascading system of floodway stormwater containment basins of claim 1, wherein said series of containment basins includes at least four basins.

7. The cascading system of floodway stormwater containment basins of claim 1 wherein the lower terminal basin includes a felt filter fabric as part of its final filtering barrier.

8. The cascading system of floodway stormwater containment basins of claim 1, wherein the lower terminal basin includes a sand berm, gravel, rip rap, boulders and filtering fabric.

* * * * *